UNITED STATES PATENT OFFICE.

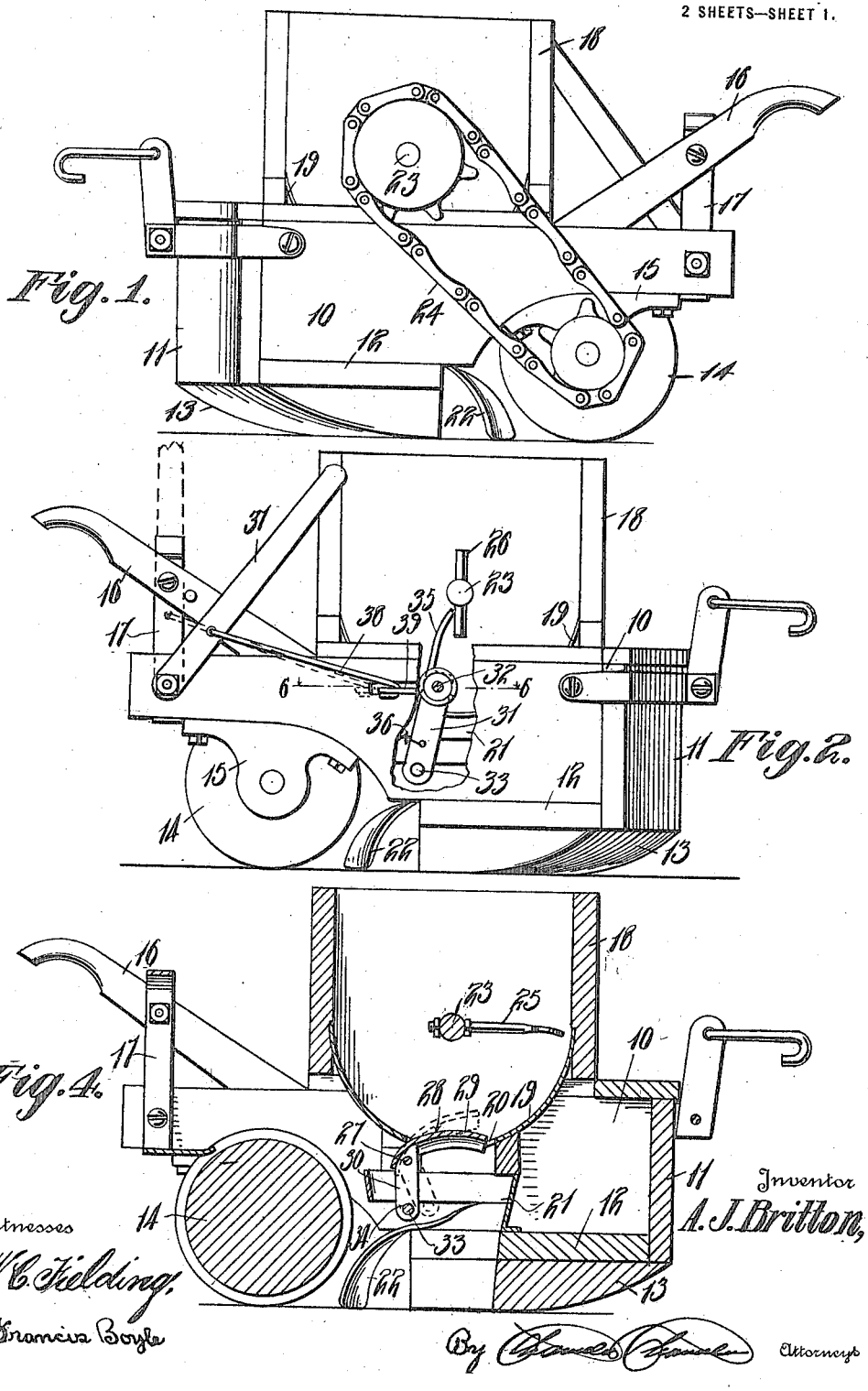

ANDREW J. BRITTON, OF NEWSOMS, VIRGINIA.

PLANTER.

1,180,759. Specification of Letters Patent. Patented Apr. 25, 1916.

Application filed October 4, 1913, Serial No. 793,468. Renewed February 11, 1916. Serial No. 77,799.

*To all whom it may concern:*

Be it known that I, ANDREW J. BRITTON, a citizen of the United States, residing at Newsoms, in the county of Southampton, State of Virginia, have invented certain new and useful Improvements in Planters; and I do hereby declare the following to be a full, clear, and exact description of the invention, such as will enable others skilled in the art to which it appertains to make and use the same.

This invention relates to planters and has for an object to provide a planter having a novel dropping valve which will be pivoted at one end on a horizontal pivot and will be rocked vertically on this pivot in such a manner as to simultaneously expose the seed port and force the seed out therethrough.

A further object of the invention is to provide a novel dropping valve which will be extremely simple in construction and will be formed of a few inexpensive parts that will not easily get out of order.

With the above objects in view the invention consists of certain novel details of construction and combination of parts hereinafter fully described and claimed, it being understood that various modifications may be made in the minor details of construction within the scope of the appended claims.

Figure 3:
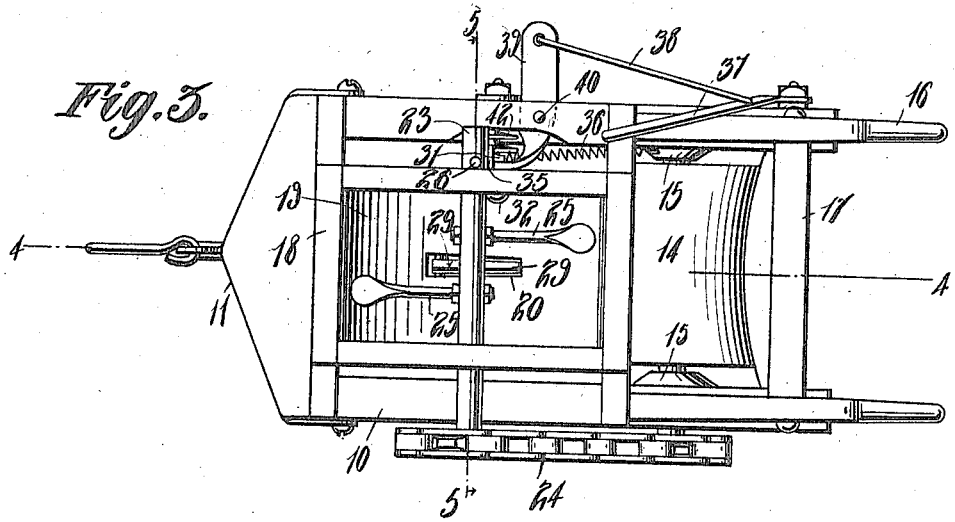
Figure 5:
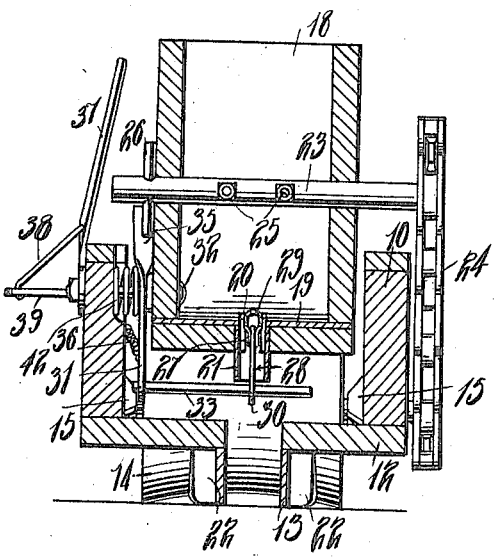
Figure 6:
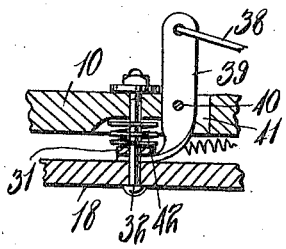

In the accompanying drawing illustrating this invention: Figure 1 is a side elevation of the planter. Fig. 2 is a reverse side elevation from that shown in Fig. 1 and showing the valve tripping mechanism in full lines in one position and in dotted lines in another position. Fig. 3 is a plan view of the planter. Fig. 4 is a longitudinal sectional view on the line 4—4 Fig. 3 showing the valve closed in full lines and open in dotted lines. Fig. 5 is a cross sectional view on the line 5—5 Fig. 3. Fig. 6 is a horizontal sectional view on the line 6—6 Fig. 2.

Referring now to the drawing in which like characters of reference designate similar parts, the planter is shown to comprise a frame including spaced sides 10, a front wall 11, the sides and front walls being connected by a bottom 12 to the lower end of which is fixed a combined seed boot and shoe 13, there being a ground roller 14 journaled in bearings 15 carried at the rear ends of the sides, there being furthermore handles 16 secured to the sides and braced by a substantially rectangular frame 17 the lower side of which forms a scraper for the ground roller.

A hopper 18 is secured to the upper edges of the sides and is provided with a downwardly rounded bottom 19 which communicates with the seed boot through a slot-like seed port 20 that is formed at the lowest point in the bottom 19 and coincides with the longitudinal axis of the machine. A sheet metal guard 21 is secured to the bottom face of the hopper bottom about the marginal edges of the seed port and serves to direct the seed into the seed boot, there being coverer fingers 22 secured to the bottom of the machine frame and serving as usual to cover the grain dropped from the boot.

An agitator shaft 23 is journaled in the sides of the hopper and is positively driven from the axle of the ground roller by means of a chain drive 24, or otherwise, the agitator shaft being equipped with a pair of oppositely extending radially disposed agitator arms 25 arranged one on either side of the seed port. The agitator shaft extends out through one side of the hopper and is there equipped with a transverse pin 26 which projects at both ends through the shaft and provides a means for positively actuating the valve twice during each revolution of the agitator shaft, as will presently be described.

Journaled at the elbow on a horizontal pivot pin 27 disposed at the rear end of the seed port, is a right angular valve 28 the upper leg 29 of which normally extends horizontally within and is of such size as to form a closure for the seed port, the lower leg 30 of the valve normally projecting vertically downward through and projecting below the sheet metal guard 21. There is a trip arm 31 journaled at the upper end on a horizontal shaft 32 the trip arm having a transverse pin 33 at the lower end which projects loosely through an opening 34 in the lower leg of the valve, the trip arm carrying at the upper end a rigid finger 35 which is normally disposed in the path of movement of the trip pin 26 carried by the agitator shaft. A helical spring 36 is secured to the trip arm and to the side of the frame and serves to normally hold the trip arm retracted with a resultant holding of the valve closed.

In operation, the trip arm is rocked on its shaft each time an end of the trip pin 26 contacts with the finger 35 whereby the lower end of the trip arm is carried forwardly with a resultant rocking of the valve on its pivot whereby the upper leg of the valve is rocked vertically with a resultant exposing of the seed port 20, the trip arm being retracted by its controlling spring 36 after passage of the trip pin beyond the trip arm finger whereby the valve is rocked to normal position, the upper leg of the valve serving to force the seed downward through the seed port during such movement.

For throwing the valve tripping mechanism to inoperative position when desired, I provide a lever 37 on one side of the frame, the lever being connected by a link 38 to a horizontally disposed angular lever 39 which is mounted on a vertical pivot 40 arranged in a slot 41 in one side of the frame, the working end of the lever 39 being disposed between the trip arm and the adjacent side of the hopper. Upon the handle lever 37 being rocked rearwardly, the angular lever 39 is rocked with a resultant sliding of the trip arm bodily outward on its shaft by the working end of the angular lever so that the trip finger is disposed out of the path of movement of the trip pin 26. This movement of the trip arm takes place against the pressure of a helical spring 42 seated on the trip arm shaft which spring will automatically return the trip arm to operative position upon release of the handle lever. As above stated the trip arm pin 33 is mounted loosely in the opening 34 in the valve so that this pin may slide outwardly upon such movement of the trip arm without disturbing the valve which latter it may be here stated is held closed by its controlling spring 36 when the trip arm is in inoperative position.

From the above description it will be seen that I have provided an extremely simple and effective valve mechanism for planters, which mechanism is formed of a few parts that are strong and durable and will not easily get out of order.

What is claimed is:—

A planter including a frame, a hopper carried by said frame, there being a slot-like seed port in the bottom of said hopper, a vertically rocking valve pivoted at one end on a horizontal pivot and serving to normally seal said port, an agitator shaft in said hopper, a trip pin projecting from said shaft, a trip arm journaled on a horizontal pivot and connected at one end with said valve, a trip finger rigid with said arm and normally disposed in the path of movement of said trip pin, means for actuating said agitator shaft whereby said valve is positively tripped and rocked up to open position to expose said port, and a tension device connected to said trip arm for returning the parts to normal position after each actuation.

In testimony whereof, I affix my signature, in the presence of two witnesses.

ANDREW J. BRITTON.

Witnesses:
J. B. EVERETT,
H. E. BAILEY.

Copies of this patent may be obtained for five cents each, by addressing the "Commissioner of Patents, Washington, D. C."